(No Model.)

W. J. WILSON.
WHEEL FOR WHEELBARROWS.

No. 359,045. Patented Mar. 8, 1887.

Witnesses:
E. J. Walker
Jos. B. Whitaker

Inventor:
William J. Wilson
By his attys
Whitaker & Prevost

N. PETERS, Photo-Lithographer, Washington, D. C.

UNITED STATES PATENT OFFICE.

WILLIAM JOHN WILSON, OF AUBURN, NEW YORK.

WHEEL FOR WHEELBARROWS.

SPECIFICATION forming part of Letters Patent No. 359,045, dated March 8, 1887.

Application filed January 20, 1887. Serial No. 224,880. (No model.)

*To all whom it may concern:*

Be it known that I, WILLIAM JOHN WILSON, a citizen of the United States, residing at Auburn, in the county of Cayuga and State of New York, have invented certain new and useful Improvements in Wheels for Wheelbarrows; and I do hereby declare the following to be a full, clear, and exact description of the invention, such as will enable others skilled in the art to which it appertains to make and use the same.

My invention relates to improvements in wheels for wheelbarrows, gearing, and all other connections where a wheel with a rigid axle is desired; and it consists of a peculiar formation and construction of the spokes, rim, and axle for the purpose of securing lightness, strength, and durability.

In order that my invention may be clearly understood, I have illustrated in the annexed drawings and will proceed to describe the same as applied more particularly to wheelbarrows.

Figure 1:
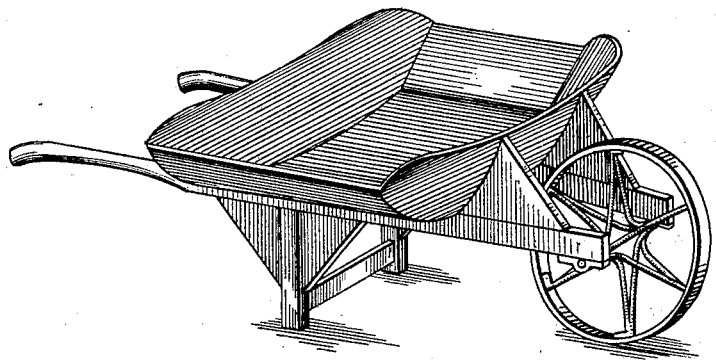
Figure 2:
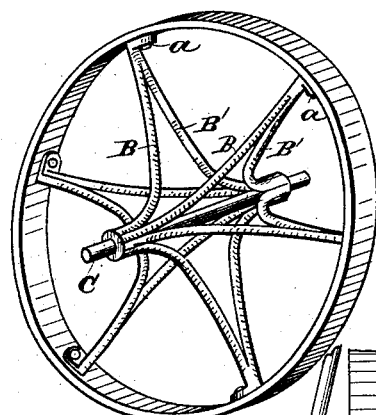
Figure 3:
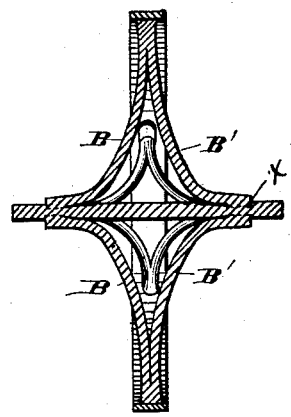
Figure 4:
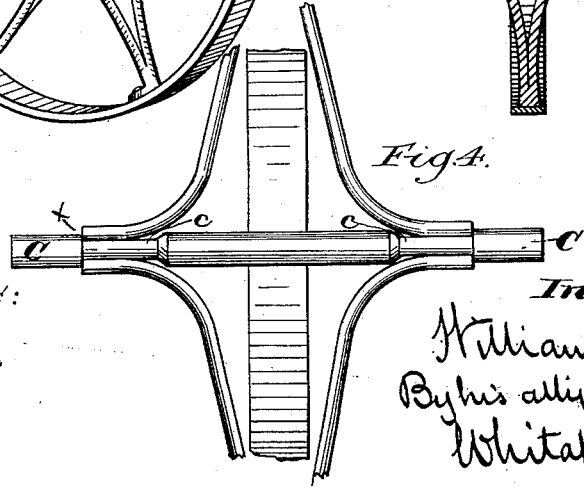

Figure 1 represents a wheelbarrow provided with my improved wheel. Fig. 2 represents the wheel in perspective. Fig. 3 shows a vertical section of a wheel of my improved construction. Fig. 4 is also a vertical section showing the mode of connecting the spokes with the axle.

In order to accomplish the object of my invention, which is to produce a wheel of superior lightness, strength, and durability at a minimum cost, I construct the wheel entirely of wrought-iron. The tire or rim A is connected with the axle and retained in position by means of the spokes B B', which are formed of pieces of iron bent as shown in the drawings. A short distance within the rim or tire these spokes are welded together, and the end thus formed is flattened and bent at right angles, to provide the lugs $a$, by means of which each pair of spokes may be fastened rigidly to the rim in any desired manner, but preferably by bolts or rivets.

The axle C is provided near its extremities with reduced portions $c$ $c$, the shoulders $x$ $x$ intervening between the reduced parts and the outer ends of the axle, which outer ends constitute the journals of the wheel.

The inner ends of the spokes are separated and caused to curve outward until they are brought in contact with the reduced portions $c$ $c$ of the axle, the ends abutting against the shoulders $x$ $x$. It will be noticed that this mode of connecting the spokes to the axle greatly strengthens the axle at a very desirable point—the point of uniting the spokes to the same—as the ends of the spokes when welded together form a continuous circular enlargement of the axle. The wheel is also furnished with additional strength, for the spokes being welded to the axle and to each other there is very little chance of their becoming detached, for should they become separated from each other or from the axle they would yet remain against the shoulders $x$ $x$.

When the spokes have been properly placed in the wheel, it is in proper shape for use, the ends of the axle which project beyond the extremities of the spokes forming the journals. The extremities of the spokes welded together form shoulders which keep the journals in the bearings in which they are placed.

What I claim, and desire to secure by Letters Patent, is—

1. A wheel consisting of a rim, axle, and spokes, the spokes being united to form a single body at some point between the axle and rim and rigidly connected to the latter, and divided near the axle and welded to the same and to each other on both sides of the rim, substantially as described.

2. A wheel consisting of a rim, an axle provided with reduced portions on each side of the rim, and spokes attached to the rim and welded to the reduced portions of the axle, substantially as described.

3. A wheel consisting of a rim, an axle having short reduced portions with outer straight shoulders, and spokes connected to the rim and welded to the reduced portions of the axle with their ends abutting against said shoulders, substantially as described.

4. A wheel consisting of a rim, an axle having short reduced portions on each side of the rim, and spokes connected to the rim by a single connection, said spokes being united at a point between the rim and axle, and divided near the axle and welded to the reduced portions of the axle on each side of the rim, substantially as described.

5. A wheel consisting of a rim, an axle having reduced portions on each side of the rim, and spokes connected to the rim and united between the rim and axle, and divided near the axle and welded to the reduced portions of the axle and to each other, substantially as described.

In testimony whereof I affix my signature in presence of two witnesses.

WILLIAM JOHN WILSON.

Witnesses:
HENRY O'BRIEN,
ELMER E. MORSE.